United States Patent Office 3,359,059
Patented Dec. 19, 1967

3,359,059
PROCESSES FOR ORNAMENTING BY LOCALIZED COLORING OF PREFORMED CONTINUOUS WEBS FORMED OF SOLID POLYOLEFINS
Domenick Donald Gagliardi, 185 Howland Road, East Greenwich, R.I. 02818
No Drawing. Filed Oct. 16, 1963, Ser. No. 316,539
The portion of the term of the patent subsequent to July 23, 1980, has been disclaimed
1 Claim. (Cl. 8—72)

ABSTRACT OF THE DISCLOSURE

Fabrics, films, sheets and other preformed solid articles formed of solid polyolefin material, which in the absence of treatment are non-receptive to dyes and coating materials, may be durably ornamented with variegated coloring by patterned application to the polyolefin article of a viscous paste formed of an aqueous solution of pasty consistency containing a polyolefin receptivity modifier agent, e.g., alpha-sulfolauric acid, heating the article and applied paste to 100–150° C. to imbue the article with the receptivity agent and then dyeing the article in an aqueous dyebath.

Cross-references to related applications

Reference is made in accordance with 35 U.S.C. 120 to the following other applications:

S.N. 106,173—filed Apr. 28, 1961, and now U.S. 3,151,928
S.N. 106,173—filed Apr. 28, 1961, and now U.S. 3,131,928
S.N. 123,988—filed July 14, 1961, and now U.S. 3,148,017
S.N. 188,568—filed Apr. 19, 1962, and now U.S. 3,145,073
S.N. 189,280—filed Apr. 23, 1962, and now U.S. 3,150,917
S.N. 196,908—filed May 23, 1962, and now U.S. 3,169,823
S.N. 217,544—filed Aug. 17, 1962 and now U.S. 3,159,824.

Solid high molecular weight olefin polymers, exemplified by such commercially available materials as polyethylene and polypropylene possess many attractive properties in addition to their relatively low cost of manufacture and fabrication. Continuous films and fabrics formed of such olefin polymers account for much of the commercial use of these materials. Although uncolored polyolefin is used for packaging purposes, many uses of films and most uses of fabrics of polyolefins require the polymer to be colored.

The coloring of articles made of polyolefins has presented the polymer manufacturers and fabricators of articles from the polymers with serious problems. Thus, solid high molecular weight polyolefins are extremely inert and have very low degree of adhesion to most other materials. Actually, polyethylene, polypropylene and similar solid high molecular weight polyolefins have such a low degree of adhesion and such a high degree of repellency to water and water-soluble dyes that the polymers are classified as undyeable with conventional water-soluble dyestuffs. Pigments and other coating agents which can be satisfactorily used to color most other types of synthetic polymers are also generally repelled by the polyolefins.

It is possible to form colored articles of polyolefins by incorporating oil-soluble dyes or suspending pigments in the polymers, such as by melt-mixing, prior to the fabrication of the solid polymer into a final shaped article. This obviously restricts a film to a single color and requires use of different colored filaments to produce multi-colored fabrics. So many different product colors are demanded by users of the films or fabrics because of style, custom or personal taste that it is impractical for textile manufacturers, package suppliers and other fabricators of polyolefins to maintain an inventory of separate colors for every possible item to be made from the polyolefin materials. Hence, there is need for effective and commercially feasible methods of permitting the polyolefin films and fabrics to be colored after, not before, their formation.

One approach to this problem has been to modify the olefin polymer as it is formed, such as by copolymerization with modifying copolymerizable materials, in order to render the resulting polymer receptive to conventional dyestuffs and coating compositions. This approach is not completely satisfactory because it substantially increases the cost of the resulting polymers, thereby detracting from one of the main features of olefin polymers, namely, low cost. Also the copolymerization generally detracts from desired physical and chemical properties of the polymers.

Another way in which this coloring problem has been attacked has been to modify the surface of films, fibers or other preformed articles by chemical reaction with strong reagents or high energy radiations. For example, some success has been obtained in promoting improvement in dye receptivity of polyolefins by sulfonation of the article surfaces by strong reagents, such as oleum, concentrated sulfuric acid; nitration, such as with concentrated nitric acid; or oxidation, such as with atomic oxygen or ozone, as halogenation. Also, some success has been attained by irradiating the surface of the article with X-rays, gamma rays, or other high energy particles or radiations. Such procedures may be satisfactory for film or other articles which present only simple surfaces, but are generally unuseable with articles of complicated surface contour, e.g., woven fabrics or the like. There exists a real demand for a practical method by which films and fabrics of polyolefins may be ornamented by variegated coloring in the form of continuous webs at high rates of production and at a relatively low cost.

A principal object of this invention is the provision of new processes for the ornamentation of preformed articles composed of solid olefin polymers. Further objects include:

(1) The provision of new processes for variegated coloring of films, fabrics and other continuous webs formed of solid olefin polymers by which the articles may be colored in controlled patterns in deep shades with the coloring being resistant to removal by washing, dry-cleaning and other cleansing or handling operations to which the polymer article may be subjected during normal use.

(2) The provision of new procedures which may be employed by textile manufacturers, film fabricators or similar converters of olefin polymers for print coloring continuous lengths of polyolefin films and fabrics in deep shades without recourse to special chemical modification of the polymer molecules or drastic pretreatment of the polymer in order to render the polymer receptive to coloring material.

(3) The provision of new procedures and materials for coloring continuous lengths of polyolefin films and fabrics that may be carried out in equipment conventionally available and which may be used in conjunction with other conventional techniques for finishing or handling continuous webs of material.

(4) The provision of new processes for the coloring of continuous webs of polyolefin materials which may be operated at such low cost as to not substantially increase the final cost of the polyolefin product.

(5) The provision of new methods for coloring polyolefin films and fabrics in continuous lengths that may be applied at any suitable or commercially attractive time after the film or fabric has been fabricated from the solid raw olefin polymer, thereby completely eliminating the need for commercial manufacturers of such continuous lengths to retain any substantial inventories of colored products because the new operations make it possible to color complete rolls of the articles substantially immediately in response to a customer demand for any particular color of item.

(6) The provision of new forms of print pastes for use in the variegated coloring of polyolefin films and fabrics.

(7) The provision of new methods of treating polyolefin films and fabrics so that when they are immersed in aqueous dye baths, selected areas only will become colored in a deep shade of the dye bath.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished in accordance with the present invention by a process which comprises the following combination of steps:

(A) Applying to the surface of a preformed continuous web of polyolefin material, such as a film, woven fabric, non-woven fabric, or the like, a viscous print paste containing a polyolefin receptivity modifier agent and a water dispersible thickening agent, (B) Drying and heating the polyolefin web with the applied viscous print paste to an elevated temperature at least 10° C. below the melting point of the polyolefin material between about 100° and 150° C. for a time sufficient to cause the polyolefin surface modifier agent to imbue the surface of the polyolefin material, (C) Scouring the resulting polyolefin article to remove all portions of the print paste not permanently affixed to the surface of the polyolefin article as a result of the heating step (B), (D) Dyeing the treated surface of the article with an aqueous solution of a water-soluble dyestuff whereby the surface areas which had received the print paste will be colored while the remaining areas of the surface will remain relatively uncolored, (E) Scouring, rinsing and drying the resulting colored polyolefin material, and (F) Collecting the resulting polyolefin article, such as by rolling the continuous length up in a roll.

The print pastes are prepared using a thickening agent such as hydroxylated polymers, hydroxyethyl cellulose, methyl cellulose, carboxylated acrylic copolymers, polyvinyl alcohol, and natural gums. The thickening agent is dissolved in water to which is then added a polyolefin receptivity modifier agent. Suitable polyolefin modifying agents are those described hereinafter. To color the modified areas with cationic dyes, the print paste may contain sulfocarboxylic acids, organic phosphoric acids, sulfuric acid, and sulfuric acid yielding substances. To color the modified areas with anionic dyes as direct dyes, sulfur dyes, vat dyes, naphthol dyes, acid wool dyes, and fiber reactive dyes, the print paste may contain long chain amino compounds, including salts and quaternary compounds thereof and chrome complexes of nitrogenous carboxylic acids. The choice of polyolefin modifying agent and textile dye to use to produce prints on polyolefins is determined by the shade and brilliance desired for a particular end use. Since only the areas or pattern to be colored need to be modified in the polyolefin, the print pastes are very economical. Also in the dyeing step, only the modified areas or pattern is colored, so that the dye concentration and cost are low. The prints or colored patterns produced by this process are fast to washing, solvent cleaning and rubbing. Since the polyolefin is colored in the modified areas with soluble textile dyes and not with resin bonded pigments, the texture and feel of the polyolefin is not changed by this process.

Following the printing of the surface of the polyolefin web with the viscous print paste containing the receptivity modifier agent, it is dried and heated. Such drying and heating may be accomplished in a single drying oven or it may be accomplished in an oven or other suitable drying device separate and apart from the oven or other unit employed for heating the article with the applied receptivity modifier agent after removal of volatile solvents. Separate units for the drying and heating may be advisable in, for example, high speed operations, where it may be desirable to provide different degrees of exposure, either as to time or temperature, for the drying as opposed to the heating of the polyolefin article in the solvent-free dried state.

If separate drying and heating units are employed, it is generally advantageous to use a lower temperature in the drying unit than in the heating unit. Forced circulation of air or other gas about the traveling length of olefin polymer article promotes drying by reducing the partial vapor pressure of the evaporating solvent in the immediate region of the drying web. Temperatures of 25° C. to 120° C. or higher, but preferably 10° C. or below the melting point of the polyolefin material, are useable in the drying step.

In the heating phase of the operation, a temperature of at least about 50° C. is employed with higher temperatures being up to within 10° C. below the melting point of the polyolefin material. Temperatures of 100° to 150° C. are advantageous.

The traveling web of polyolefin material is subjected to a drying step under temperature and gas circulation conditions as described until the article dries, leaving the residue of the relatively non-volatile receptivity modifier agent on the surface of the film, fabric, or other web under treatment. An adjustment can be made between the amount of print paste applied to the continuous web, e.g., by regulating the pressure of printing rolls, and the concentration of the solution being applied so as to obtain substantial variation in the ultimate quantity of receptivity modifier agent retained upon the surface of the polyolefin material after the drying step and during the heating step. Such variations in pick-up and solution concentration may be regulated to leave between about 0.01 to 10% by weight and, advantageously, from about 0.1 to 5%, of the receptivity modifier agent based upon the total weight of polyolefin material, upon any given portion of the continuous length being treated.

The heating step serves to durably fix the receptivity modifier agent to the polyolefin material with a degree of permanency that keeps it from being removed by washing, dry-cleaning and other cleansing or handling operations to which polyolefin surface is subjected in subsequent steps of the operation as well as normal handling in use of the product by the ultimate consumer.

The form of attachment of the receptivity modifier agent to the polyolefin is not certain and, in the case of at least some of the agents, does not appear to be restricted to the surface. For example, in the case of sulfocarboxylic acids and organic phosphoric acids, there appears to be some diffusion into the fiber or film as a result of the heating step.

At elevated temperatures as specified and especially temperatures of 100° to 150° C., heating is advantageously carried out for 0.1 to 15 minutes and especially 1 to 5 minutes, the longer times generally being used with lower temperatures and vice versa.

The heating step may be conducted in an atmosphere of air, inert gas, superheated steam, or any other desired atmosphere which does not detrimentally effect polyolefin articles under the conditions of heating.

The procedure of applying the print paste, drying and heating may be repeated one or more times if desired. Such repetition may be for several reasons. It may be desired to imbue the surface of the polyolefin article with a greater quantity of receptivity modifier agent than can be attained in a single operation. Also, it may be desirable to print one portion of the polyolefin article with one receptivity modifier agent and another area with a different agent before the application of the dye or other coloring substance, and, in such cases, different dyes may be used which are substantive to only one of the applied modifier agents.

Following the drying and heating, the continuous web of polyolefin material passes and usually is subjected to a scouring or cleansing step. This may take place in any suitable number of scouring bowls or tanks designed to cleanse and remove from the traveling continuous web any print paste portions which have not been durably united with the web as a result of the heat treatment.

The web, after the heat treatment, is dyed by contact with an aqueous dyebath or comparable coloring agent.

For this purpose, a coloring train might be used for wetting and coating the polyolefin with coloring agent followed by skying, aging and heating to promote diffusion of the coloring agent in the modified polyolefin and contact with chemical agents which develop and fix the coloring agent. On the other hand, simple immersion dyeing may be employed so that aging and coloring developing units will not be required. The coloring agents used in this step may be, for example, cationic dyes, disperse dyes, anionic dyes, water-insoluble pigments, vat dyes, etc. The textile dyes used for coloring are chosen in accordance with the particular polyolefin surface modifier agent used in the print paste and such dyes may be applied by conventional dyeing techniques. Further details and listings of specific dyes, pigments and the like are contained in my aforementioned applications and are incorporated herein by reference. This also applies to details on other aspects of this invention.

After the coloring step, the web is scoured to remove excess coloring agent, rinsed and dried. Finally, the completely colored and dried polyolefin material in continuous lengths is collected by rolling onto a mandrel or by any other suitable method of collecting the product applicable to the particular item being treated.

EXAMPLES

A further understanding of the invention will be obtained by reference to the following examples of an actual operation in accordance with the invention, in which all parts and percentages are by weight.

EXAMPLE 1

A print paste was prepared by first dissolving 37.5 parts of hydroxyethyl cellulose in 57.5 parts of water. Then 5 parts of alpha-sulfolauric acid were added. The mixture was stirred until a smooth homogeneous viscous paste was obtained. This was printed on a white sample of fabric woven in plain weave from polypropylene filaments. The print pattern from the engraved rolls consisted of a parallel series of stripes of different widths.

After printing on the polyolefin modifying print paste, the fabric was dried for 10 minutes at 95° C. Then it was heated further for 10 minutes at 115° C. After heating, the fabric was scoured for about 5 minutes with 0.1% non-ionic detergent and 0.5% sodium carbonate at 60° C. to remove print paste residues. It was dried by heating at 95° C. for about 10 minutes.

The locally modified polypropylene fabric was divided into four portions. Each portion was dyed separately with one of the cationic textile dyestuffs listed below:

Rhodamine-Basic Red #1
Sulframine-Basic Red #2
Auramine-Basic Yellow #4
Maxilon Super Black OL The dyebath contained 1% dye based on fabric weight and a fabric-dyebath weight ratio of 30:1. The polypropylene fabric specimens were immersed in the dyebath at 30° C. The bath temperature was raised to 95° C. in one hour. Dyeing was continued for one hour at 95° C. The specimens were then removed from the dyebath and were scoured in a solution of 0.1% non-ionic detergent and 0.5% sodium carbonate at 70° C., followed by several water rinses and drying. Examination of the specimens showed very deep dark coloring of the areas which had been printed with hte polyolefin modifying print paste and a striped pattern was produced. The unmodified areas between the stripes were uncolored or only barely stained by the dyeing operation.

EXAMPLE 2

A print paste was prepared as in Example 1, containing 2.5 parts of 4000 centipoise methyl cellulose thickening agent, 5 parts of butyl phosphoric acid and 92.5 parts of water. The print paste was applied, and the dyeing was performed as in Example 1 using Crystal Violet as the coloring agent. Only the printed and modified areas of the polypropylene fabric were deeply colored in a striped pattern form.

EXAMPLE 3

A print paste was prepared to contain 2.5 parts of 4000 centipoise methyl cellulose, 3 parts of sulfamic acid, and 94.5 parts of water. The print paste was applied, and the dyeing was done as in Example 1 using Crystal Violet as the coloring agent. Again, only the printed and modified areas were deeply colored.

EXAMPLE 4

A print paste was prepared to contain 2.5 parts of 4000 centipoise methyl cellulose, 5 parts of the Werner chrome complex of N-dodecyl aminopropionic acid, 12 parts of isopropanol, and 80.5 parts of water. After printing, drying, heating and scouring as in Example 1, the specimen was dyed with an anionic acid wool dye, "Wooncolan Black." After dyeing, only the areas printed with the polyolefin modifying agent were colored. The unmodified background areas remained white.

EXAMPLE 5

A print paste was prepared to contain 2.5 parts of 4000 centipoise methyl cellulose, 3 parts of distearyl dimethyl ammonium chloride and 94.5 parts of water. After printing on a polypropylene fabric as in Example 1, the specimen was dyed with an anionic direct dye, Superlitefast Brown 3RLL. After dyeing and scouring, it was noted that only the areas modified by the print paste were deeply colored.

EXAMPLE 6

A print paste was prepared to contain 5 parts of N-stearyl propylene diamine, 5 parts of acetic acid, 5 parts of a water-dispersible acrylic polymer gum and 85 parts of water. The print paste was applied in a random fashion to a film of polyethylene. This was heated for one hour at 95° C. and then scoured as in Example 1. After scouring, the film was dyed with a cyanuric chloride based reactive dye, "Procion Brilliant Blue," scoured and dried. Only the areas which had been treated with the polyolefin modifying print paste were blue colored.

A variety of materials have been found to be useable as the receptivity modifier agents to be employed in forming the print pastes used in the new procedures as outlined above. Such receptivity modifier agents are organic materials which have in their molecule one or more polar groups that are reactive with or attractive to water-soluble dyes, water-dispersible pigments or similar coloring agents. The following list provides an indication of general classes of materials, plus specific examples thereof, which may be used as receptivity modifier agents in accordance with this invention:

Amines of molecular weight between 150 and 600 containing at least one basic amino group and an attached hydrocarbon radical of at least 6 carbon atoms, e.g., alkylmonoamines:
    dodecylamine
    N,N-dicarboxypropyl octadecylamine
alkyl polyamines:
    N-dodecyl ethylene diamine
    N-hydroxyethyl N'-dodecyl propylene diamine arylmonoamines:
  N-ethyl aniline
  N-4-diphenyl octylamine
aryl polyamines:
  N-phenyl propylene diamine
  N-carboxypropyl-N'-dodecyl-N'-phenyl ethylene diamine
cycloalkyl monoamines:
  dicyclohexylamine
  rosin amine
cycloalkyl polyamines:
  N-cyclohexyl N-octadecyl ethylene diamine
  N-aminopropyl rosin amine Salts and quaternary ammonium compounds of such amines may be generally employed, e.g., dimethyl distearyl ammonium chloride.

Heterocyclic compounds of molecular weight between 150 and 600 containing at least one basic amino group, e.g., N-dodecyl morpholine
5-octadecyl pyrimidine Sulfocarboxylic acids having a molecular weight between 140 and 1000 which contain an —$SO_3H$ group or its salt and a hydrocarbon group of 2–20 carbon atoms, e.g., α-sulfostearic acid
2-sulfohexahydrobenzoic acid Organic phosphoric acids containing at least one alkyl, aryl, alkoxy or aryloxy group, advantageously containing 2 to 20 carbon atoms, e.g., octadecyl diacid orthophosphate
dioctyl acid pyrophosphate Weak sulfuric acid, sulfamic acid and precursors of sulfuric acid may be used, particularly mixtures of sulfuric acid and polyalkylene oxides in dilute aqueous solution concentration, e.g., a mixture of 0.1 to 5% sulfuric acid and 0.1 to 5% of:

polyethylene oxide
diethylene glycol monobutyl ether acetate

Werner chrome complexes of aminocargoxylic acids, e.g., of:

N-stearyl aminopropionic acid
N-dodecyl alanine.

Those skilled in the art will realize in view of this disclosure that other materials than those specifically listed above can be used for the purposes as described. More detailed information concerning variations in surface modifying agents is contained in my earlier applications listed above. The utility of any particular agent can be readily determined by those desiring to carry out the procedures as disclosed herein by simple test with a sample swatch of material. Such a test would involve immersion of the sample in a solution of the contemplated modifier agent, passage of the sample through squeeze rolls to remove excess treating solution and then subjection of the polyolefin material for about one to ten minutes to heating in an oven to a temperature between about 70° and 150° C., unless the melting point of the polyolefin is below the upper limit in which case the maximum temperature employed would be not more than within 10° below the melting point of the polyolefin material from which the sample being treated is made. This would be followed by dyeing with the dye in question and a scouring to see if the resulting coloring was fast.

A variety of water-dispersible gel-forming thickening agents that may be used to form pasty aqueous solutions or dispersion are commercially available. General classes of these materials that may advantageously be used in forming the new printing pastes of the invention include:

hydroxyalklated cellulose
methyl cellulose
polyvinyl alcohol
partially hydrolyzed polyvinyl esters
carboxylated copolymers of acrylic esters
acrylamide polymers
gum tragacanth
alginates
collagen
gum arabic
dextrine Sufficient of the thickening agent is used in the print paste to give the viscosity necessary to provide a pasty body to the printing composition, e.g., 0.1 to 50% by weight of the print paste. Water is advantageously used as the solvent in compounding the pastes, but organic solvents may be used, particularly in admixture with water, e.g., 1 to 50% of lower alcohol in admixture with water.

The invention as described above is of particular importance for the coloring of films and fabrics since these products normally demand wide variation in coloring both as to actual color and intensity. The new procedures are most advantageously used with such continuous webs that are made of solid polymers of olefin containing 2 to 6 carbon atoms, including not only the homopolymers of olefins but copolymers composed of at least 85% by weight of ethylene, propylene or other olefin units as defined in the Textile Fiber Products Identification Act (Public Law 85–897) or any olefin polymer materials equivalent thereto.

Either during or after the application of coloring materials to continuous webs of polyolefin materials as described above, other surface coatings, or treatments which normally might be applied to films, woven fabrics or the like may be combined in the process. The invention also contemplates the use, in conjunction with the coloring operations of various water-soluble and water-dispersible synthetic resins as commonly employed to improve washfastness and crockfastness of dyestuffs, pigments or the like. Such coating resins may be applied at any state of the process to produce the desired auxiliary benefits.

I claim:

A printing paste for use in the variegated coloring of fabrics formed of polyolefin fibers consisting essentially of an aqueous solution of pasty consistency of the following ingredients in the specified parts by weight:

|     |                      | Parts |
| --- | -------------------- | ----- |
| (a) | Hydroxyethyl cellulose | 37.5 |
| (b) | Water                | 57.5 |
| (c) | Alpha-sulfolauric acid | 5   |

References Cited

UNITED STATES PATENTS

| 2,689,197 | 9/1954 | Gerlich | 117—138.8 |
| 2,937,066 | 5/1960 | Walles | 8—55 |
| 2,968,576 | 1/1961 | Keller et al. | 117—138.8 |
| 3,035,933 | 5/1962 | Warner | 117—47 |
| 3,083,118 | 3/1963 | Bridgeford. | |

FOREIGN PATENTS 443,345  3/1936  Great Britain.

OTHER REFERENCES

Diserens: The Chemical Technology of Dyeing and printing, vol I, pp. 421–424, 432, 433, 451, 452 and 463, published 1948, by Reinhold Pub. Corp., N.Y.C.

Speel: Textile Chemicals and Auxiliaries, 2nd edition, pp. 94, 104–109, published 1957, by Reinhold Pub. Corp.

DONALD LEVY, *Primary Examiner.*